July 20, 1937.  W. VAN GUILDER  2,087,709
MECHANICAL DRIVE SYSTEM
Filed Feb. 3, 1936  3 Sheets-Sheet 1
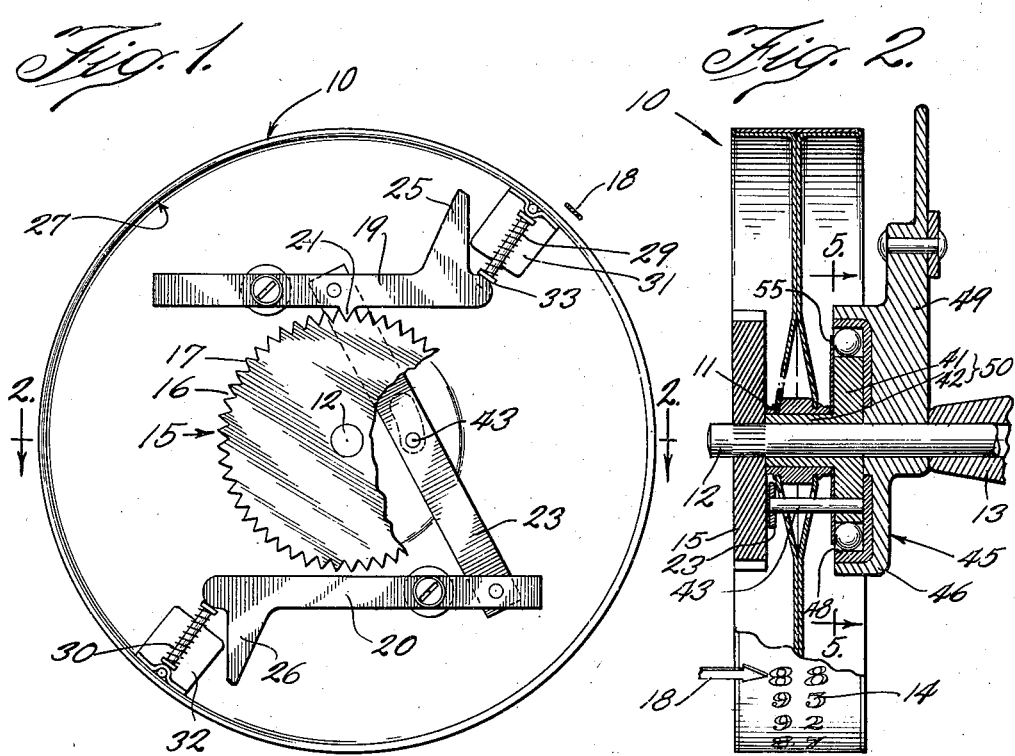
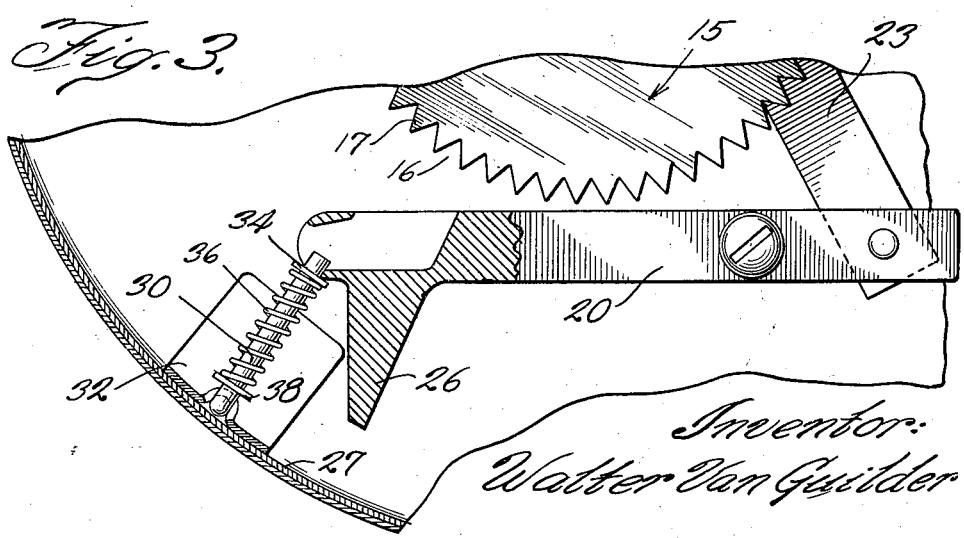
Inventor:
Walter Van Guilder
By Karl H. Sommermeyer
Atty.

July 20, 1937.  W. VAN GUILDER  2,087,709
MECHANICAL DRIVE SYSTEM
Filed Feb. 3, 1936  3 Sheets—Sheet 2

Inventor:
Walter Van Guilder
By Karl W. Sommermeyer
Atty.

July 20, 1937. W. VAN GUILDER 2,087,709
MECHANICAL DRIVE SYSTEM
Filed Feb. 3, 1936 3 Sheets-Sheet 3

Inventor:
Walter VanGuilder
By Karl W. Sommermyer Atty.

Patented July 20, 1937

2,087,709

UNITED STATES PATENT OFFICE 2,087,709

MECHANICAL DRIVE SYSTEM

Walter Van Guilder, Oak Park, Ill., assignor to G-M Laboratories, Inc., Chicago, Ill., a corporation of Illinois Application February 3, 1936, Serial No. 62,164

7 Claims. (Cl. 273—143)

My present invention relates generally to mechanical drives and relates more particularly to apparatus for spinning an apparatus for making random indications and selections and for stopping it in perfect register in one of a number of positions, which one position is to be selected at random by the operation of the apparatus itself.

My present invention contemplates the provision of a dog which is adapted to engage a series of notches and which is spring actuated and centrifugally controlled to select one of said notches at random and then to firmly and accurately seat itself therein. The invention contemplates also that the dog shall be actuated by a centrifugal system of weights carried by the spinning selector apparatus itself, that the dog normally shall be held seated in a notch by a spring, that it shall be disengaged therefrom by direct action of the driving power that spins the selector, that the dog shall again engage a notch only after the spinning selector decelerates to a low speed and that it shall be centrifugally controlled to snap suddenly into engagement with the notches and seat itself firmly in one of said notches to accurately register the selector for purposes of indicating its selection.

It is contemplated further that the points of fastening of the spring for actuating the weights shall be so located with respect to the directions of motion of said weight as to produce a large change in the mechanical advantage of said spring as a result of the movement of said weights so that the dog executes a snap motion into engagement with the notches. It is further contemplated that as the dog moves into engagement with the notch, the force available to oppose the centrifugal force of the dog shall increase to many times the centrifugal force required to hold it in the position it occupies when the operating springs are fully extended and also many times the centrifugal force required to hold it in the position which it occupies when the dogs have moved as far as possible under the action of the centrifugal force which controls them.

My present invention further contemplates the use of my improved centrifugal registering mechanism with a conventional over-running clutch in an improved spinning mechanism for giving random indications.

The primary object of my present invention is the provision of an improved, centrifugally controlled registering mechanism.

A further object consists in the provision of an improved and simple apparatus for giving random indications and for making random selections.

These and other objects and advantages of the present invention will appear as the description proceeds.

In order better to acquaint those skilled in the art with the teachings and practice of the present invention, I now shall describe certain specific embodiments thereof, reference being had to the accompanying drawings which form a part of the specification and in which:

Figure 1 is a view in elevation of the preferred embodiment of my present invention.

Figure 2 is a section taken along the line 2—2 of Figure 1 looking downward in Figure 1 as indicated therein by the arrows.

Figure 3 is an enlarged detailed view of a part of the apparatus shown in Figure 1.

Figure 4:
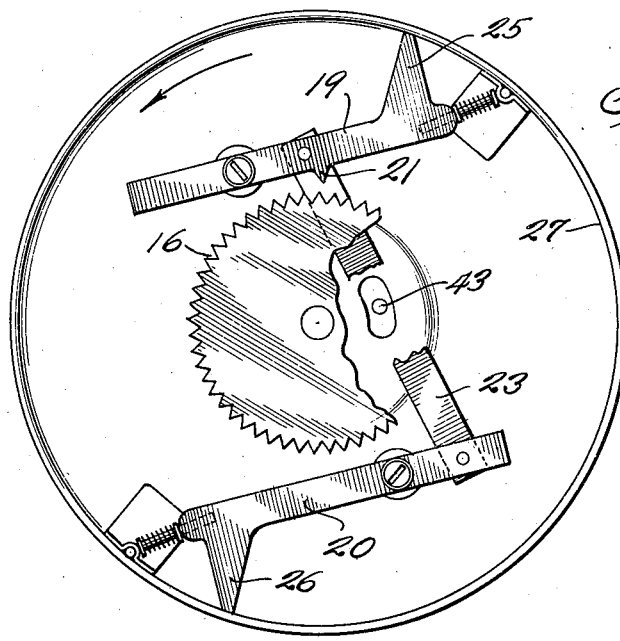
Figure 4 is a view like Figure 1 but showing the parts in another operated position.

Referring to Figures 1 and 2, the reference numeral 10 indicates generally a wheel or rotatable member carried on a hub 11 which is adapted to turn freely about a shaft 12 subject only to restraints imposed by the driving mechanism which will be described later. This wheel 10 is adapted to be rotated or spun by the driving mechanism in a counter clockwise direction as viewed in Figure 1. Fixed to the shaft 12 is a disc 15 carrying a series of uniform notches 16 about its periphery. This disc 15 is securely fastened to the shaft 12 so as to be nonrotatable thereon. The cylindrical surface of the wheel 10 carries a design 14, or a series of legends or numbers or the like which may be read by an operator or observer for determining the random selection which the wheel makes in operating in the manner presently to be described. Cooperating with the design 14 is an index or pointer 18. The index 18 is stationary but is located close to the design 14. The characters of the design 14 are spaced in a manner to correspond to the notches of the disc 15 which serves to register the wheel so that the wheel stops with one of the individual characters of the design 14 registered with the index 18. Pivotally carried by the wheel or rotatable member 10 are a pair of weights 19 and 20. These are of similar shape and weight. They are symmetrically disposed on the wheel 10 and their pivots lie on a line through the center of the wheel 10.

The pivoted weight 19 is provided with a small projection in the shape of a triangular prism 21 which serves as a dog for engagement with the notches 16 of the member 15. A tie-bar 23 links the two similar weights 19 and 20 together so that they move together and always occupy symmetrical positions with respect to the axis of the wheel 10. This arrangement permits the weights 19 and 20 to balance each other against the force of gravity and to keep the wheel 10 as a whole balanced with respect to its axis of rotation. Referring now to Figures 1 and 3, the weight 19 carries a projection 25 and the weight 20 carries a similar projection 26 which serves as a stop which engages the inner side of the rim 27 of the wheel 10 in the manner shown in Figure 4 to limit the motion of the weights about their respective pivots.

Each of the weights 19 and 20 is provided with a spring toggle which may be described best with reference to Figure 3 showing an enlarged detail of the toggle for the weight 20. A toggle arm 30 is pivoted at one of its ends near the rim 27 of the wheel 10 by means of a clip 32. The toggle arm 30 is provided with a shoulder 38 and carries a spring 36 and a washer 34. The outer end of the arm 30 is guided in a recess in the end of the weight 20. The spring 36 presses the washer 34 against the curved end of the weight 20. As the weight 20 turns about its pivot, the washer 34 slides over this curved surface. The toggle of the weight 19 is similar. The two springs 35 and 36 of these toggles continually urge the dog 21 into engagement with the notches 16. As shown in Figures 1 and 3, when the dog 21 is in engagement with one of the notches 16, the springs 35 and 36 act in directions having angles of about 35 degrees from the direction in which the ends of the weights 19 and 20 engaging the springs travel as those weights rotate about their pivots. Similarly, it can be seen from Figure 4 that when the weights 19 and 20 are thrown out against the rim 27 of the wheel the springs 35 and 36 act in directions having angles of more than 80 degrees from the direction in which the weights 19 and 20 move in rotating about their pivots. For this reason the springs 35 and 36 are more effective for rotating and moving the weights 19 and 20 and for operating the dog when the dog is engaging one of the notches than when the dog is not in engagement with the notched member 15.

When the wheel 10 is stationary, the springs 35 and 36 hold the weights 19 and 20 in the position shown in Figures 1 and 3 so that the dog 21 engages the notched member 15. If the wheel is rotated slowly the dog 21 will click over the notches 16. If the wheel is spun at high-speed the centrifugal forces acting on the weights 19 and 20 throw them out so that they occupy the positions shown in Figure 4. In this position the weights 19 and 20 and the dog 21 have no decelerating effect upon the wheel 10. However, friction in the moving parts serves to gradually decelerate the wheel 10 until the centrifugal force becomes too small to overcome the action of the springs 35 and 36 which urge the weights 19 and 20 towards the center of the wheel 10. As was previously pointed out, the effect of the springs on the weights 19 and 20 and the rotative effort which they exert thereon, is comparatively small when the weights 19 and 20 are thrown out against the rim of the wheel 10. Therefore, the wheel will decelerate to a comparatively low speed before the weights 19 and 20 will move in to engage the dog 21 with the notched wheel 15. As soon as they begin to move in, the springs 35 and 36 assume a more advantageous angle with respect to the direction of motion so that the difference between the rotative effects of the springs and the centrifugal force increases in favor of the spring. Consequently the weights 19 and 20 move in with a snap action and the dog 21 comes sharply into engagement with the notched member 15 and bears firmly thereagainst. The dog 21 then clicks over the notches 16 and in so doing rapidly decelerates the wheel until it stops. Because the dog 21 is sharply pointed and because the projections 17 between the notches 16 are also sharply pointed the dog 21 cannot easily rest against one of the projections 17. Therefore, it slips into register with one of the notches 16 and the springs 35 and 36 seat it firmly therein. As a result the wheel comes to a stop with the dog 21 accurately seated in one of the notches of 16 to register the wheel.

It is thus seen that my improved mechanism serves to stop the wheel and accurately to register it in a position corresponding to one of the notches 16.

Figure 5:
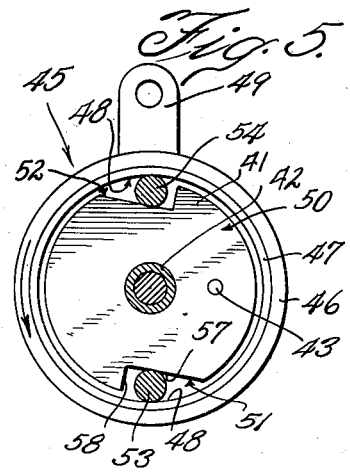
Figure 5 is a detailed section taken along the line 5—5 of Figure 2 looking toward the right in Figure 2 as indicated by the arrows.
Figure 6:
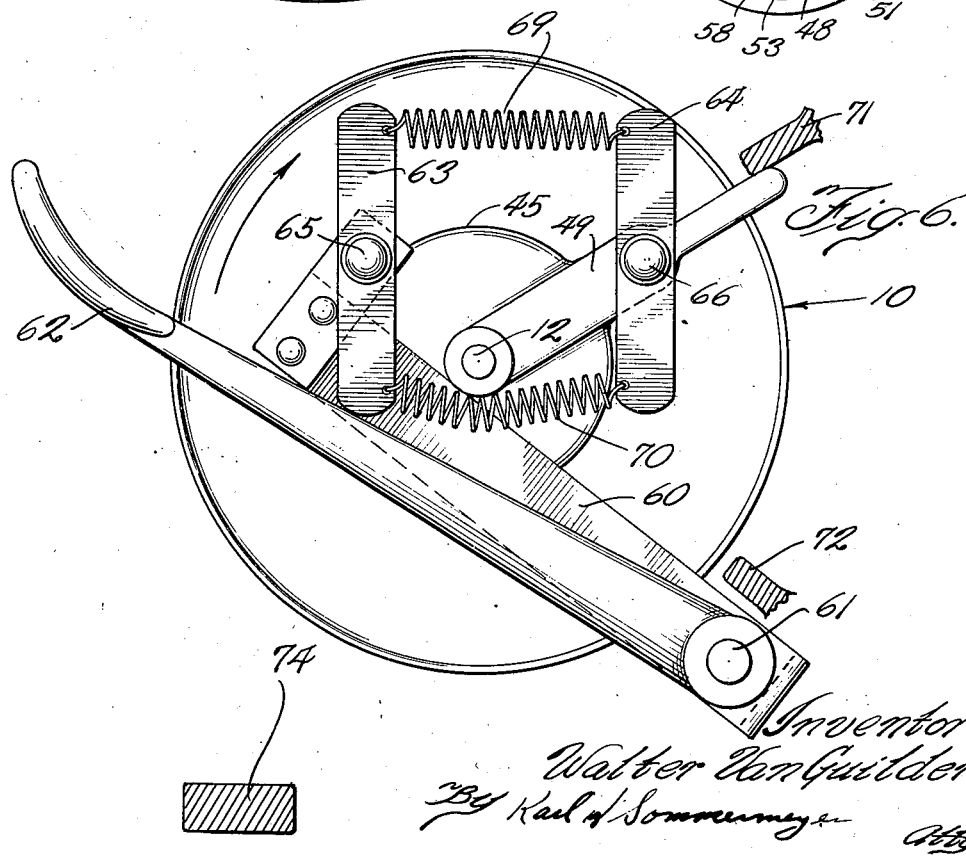
Figure 6 is another elevational view of the preferred embodiment of my invention and is taken from the opposite side of the apparatus from the view in Figure 1.

Referring to Figures 2, 5, and 6 of the drawings, the reference numeral 45 indicates generally an over-running clutch. The over-running clutch includes a hollow housing 46 of die-cast metal or the like and has a hardened steel cup 47 therein with a hard internal cylindrical surface 48. The housing 45 also carries an extension or an arm 49 which is connected to a spring snap mechanism for driving the same and which will be described presently. The housing 45 is adapted to rotate about the shaft 12 which supports it. Located within the housing 45 is a driven member 50 which includes a disc or plate portion 41 and a bushing portion 42. The bushing portion 42 fits freely on the shaft 12 and carries the hub 11 of the wheel 10 freely thereon. A pin 43 securely fastened in the plate 41 extends through a clearance hole in the web of the wheel 10 and engages a hole in the center of the tie bar 23. This hole is midway between the points at which the tie bar is fastened to the pivoted weights 19 and 20. As has already been described, the pivots which support the weights 19 and 20 are equally spaced from the center of the shaft 12 and are on a line therethrough. Therefore when the weights 19 and 20 turn on their pivots, the center of the hole in the middle of the tie 23 describes an arc about the center of the shaft 12. Therefore the pin 43 which is carried about this same center by the member 50 will still permit the motion of the weights about their pivots as already described. This pin is the only connection for driving or spinning the wheel 10. The spinning or driving operation will be described presently.

The disc portion 41 has a pair of notches 51 and 52 disposed diametrically opposite to each other and in which are located a pair of steel balls 53 and 54. A disc or cover 55 retains the balls 53 and 54 in their respective notches (see Fig. 2). The walls of each of the notches 51 and 52 are unsymmetrical with respect to any radii of the plate or disc 41. Thus in the notch 51 the wall 57 makes a small angle with a line tangent to the surface 48 at the point where it engages the ball 53, whereas the surface 58 of the same notch 51 makes a large angle, approximately a right angle, with the same tangent.

When the shell or housing 45 rotates with respect to the plate 41 the balls 53 and 54 will move under the action of friction in the notches 51 and 52 in the direction of the relative motion of the housing 45, and in so doing will bring the balls against one or the other of the unsymmetrical walls of the notches 51 and 52. Thus when the housing 45 rotates in a clock-wise direction with respect to the plate 44, the ball 53 for example will be carried against the surface 58 of the notch 51 and then will simultaneously engage the surface 48 and the surface 58 which move relative to each other. However because of the large angle between these two surfaces the ball will slide on one or the other. When the housing 45 is rotated in a counter-clock-wise direction with respect to the plate 41, the ball 53 for example will move into engagement with the surface 57 of the notch 51 and consequently it will engage simultaneously both the surface 57 and the surface 48 which converge at a comparatively small angle. This angle is less than the angle of friction of the steel surfaces. It is well known that the term "angle of friction" expresses a characteristic of two surfaces and its value depends upon the value of the co-efficient of friction of those surfaces. Consequently, the ball 53 will jam between these two surfaces. Similarly the ball 54 will jam between the corresponding wall of its notch 52 and the cylindrical surface 48 of the housing. Consequently the housing 45 no longer can rotate counter-clock-wise with respect to the plate 41 and it necessarily carries the plate 41 with it. Thus referring to Figures 2 and 6, when the housing 45 rotates in a clock-wise direction as viewed in Figure 6, it rotates the wheel 10 therewith. The ilustrations of Figures 1 and 6 view wheel 10 from opposite sides so that the wheel appears to rotate counter-clock-wise in Figure 1 (and therefore also in Figures 4 and 5) but it appears to rotate clock-wise in Figure 6.

Preferably I actuate my apparatus with a spring toggle snap mechanism illustrated in Figure 6 and which is more completely described in the copending application of Karl H. Sommermeyer, Serial No. 62,165, filed February 3, 1936. The toggle mechanism comprises two levers of which an actuating lever 60 is one and the arm 49 of the over-running clutch mechanism already described is the other. It also includes a tension spring arrangement connected between these two levers and suitable stops for the levers. The actuating lever 60 rotates about a shaft 61 and is adapted to be operated manually by means of a hand lever 62. A cross-piece 63 is pivoted to the actuating lever 60 at a point 65 and similarly a cross piece 64 is pivoted to the arm 49 of the over-running clutch at 66. Connected between the ends of these cross pieces 63 and 64, are a pair of tension springs 69 and 70. The assembly consisting of the cross-pieces 63 and 64 and the springs 69 and 70 are equivalent, so far as the toggle action and the operation of the toggle snap mechanism is concerned, to a single spring tensioned between points 65 and 66 respectively of the actuating lever 65 and the arm 89 of the clutch mechanism. In the present construction, the arrangement shown is employed merely to permit the line of action, which is on a straight line between the points 65 and 66 to cross the axis of the shaft 12 without having to permit a spring to cross that axis since it is undesirable to sever the shaft for that purpose. As may be observed in the illustration of Figure 6 and in the diagram of Figures 7 and 8, the springs under certain conditions strike against the hub of the housing 45 or against the stationary supporting boss 13 of the shaft 12. However, as will be explained presently, this is immaterial because it occurs only when the arm 49 has already moved in response to the actuation of the lever 60.

Figure 7:
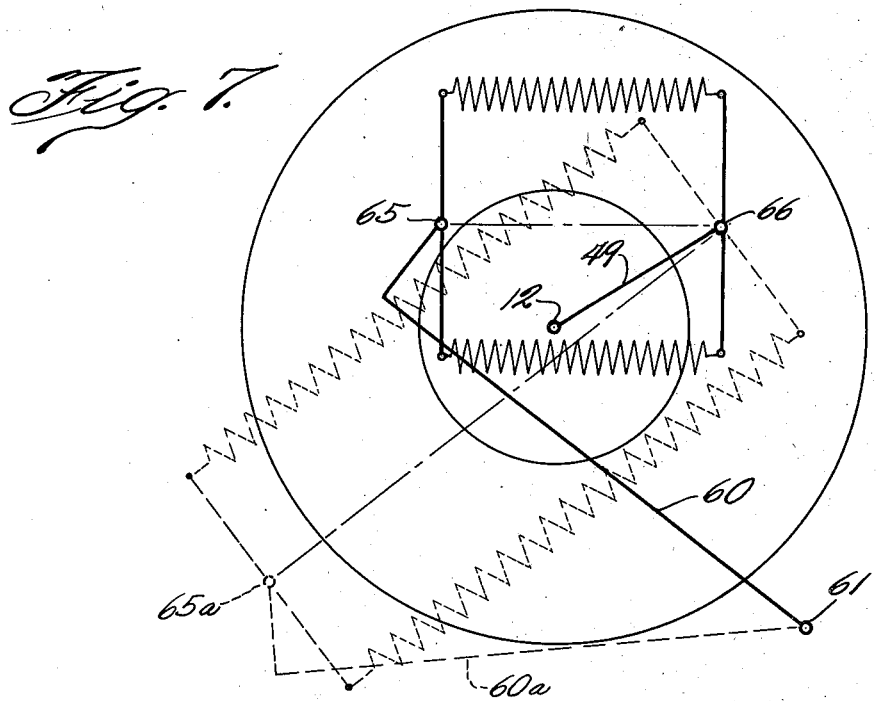
Figures 7 and 8 are diagrams serving to illustrate the operation of the mechanism illustrated in Figure 6.
Figure 8:
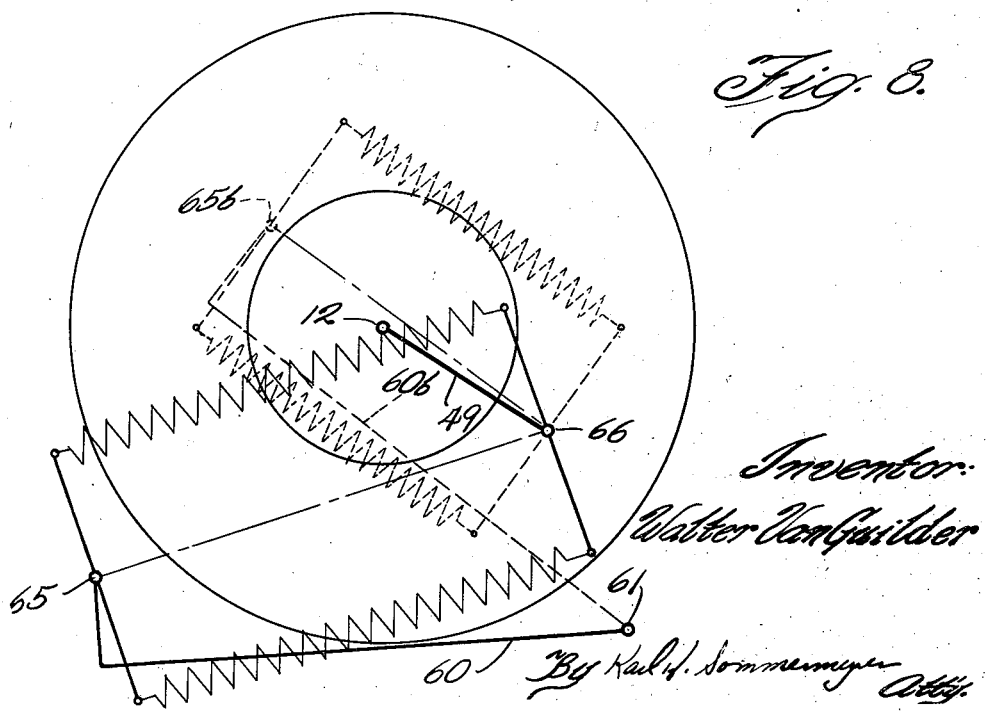

A pair of stops 71 and 72 are adapted to engage the arm 49 for limiting the arcuate travel or rotation thereof about the shaft 12. In the position shown in Figure 6, the actuating lever 60 lies against the hub of the housing 46 which serves as one stop therefor. A fixed block 74 serves as the other stop for the lever 60. The operation of the snap mechanism may be described best in connection with the diagrams of Figures 7 and 8. In Figures 7 and 8, the solid lines represent the position of the lever 60 and the arm 49 in the positions which they occupy in the illustration of Figure 6. In that same figure 60—a represents the position of the actuating lever 60 when it has been moved against the stop 74. In that position the line of action between the points 65 and 66 has crossed the axis of the shaft 12 about which the arm 49 is adapted to rotate so that the springs tend to rotate the arm 49 in a clock-wise direction as viewed in Figures 6 and 7. When the arm 49 begins to rotate, the angle of action of the spring with respect to the arm 49 improves so that the rotative effort increases with the motion of the arm 49 at least during the initial motion thereof. The arm 49, therefore, snaps down due to the action of the spring (rotates clock-wise) so that the arm 49 and the lever 60 assume the positions shown in Figure 8. It is to be observed that the line of action between the points 65 and 66 has not crossed the axis of the shaft 61. Therefore, the springs still urge the lever 60 in the same direction as they did before. That is, they urge the lever 60 upwards to rotate it in a clock-wise direction about the shaft 61 as viewed in Figures 6, 7, and 8. Consequently when the handle 62 is released the lever 60 moves upward to occupy the position 60—b shown in dotted lines in Figure 8. In so doing, it causes the line of action between the points 65 and 66 again to cross the axis of the shaft 12 (see line between the points 65—b and 66 in Figure 8), this time bringing the line of action of the spring above the axis of the shaft 12 about which the arm 49 is adapted to rotate. Consequently the spring now urges the arm 49 in a counter-clock-wise direction and the arm 49 again snaps from one extreme position of its travel to the other. This brings the mechanism back to the position shown in Figures 6 and 7.

When the operating handle 62 is manually depressed, causing the arm 49 of the over-running clutch to snap in the clock-wise direction in Figure 6, it also sets the wheel 10 into motion as follows: When the arm 49 snaps down the direction of rotation of the housing 46 is in such direction that it drives the member 50 therewith. This is in a counter-clock-wise direction as viewed in Figures 1, 4, and 5. The pin 43 drives against the tie bar 23. The wheel 10, solely because of its own inertia resists rotation so that the driving force exerted by the pin 43 on the tie bar 23 immediately moves the weights out to the position shown in Figure 4, after which the full force of the springs 69 and 70 are available for accelerating the wheel 10. As soon as the wheel has accelerated sufficiently the centrifugal force will retain the weights in the position shown in Figure 4. In resisting the initial driving action of the pin 43 as it drives against the tie bar 23, the wheel 10 is itself accelerated with the result that some rotation of the wheel occurs from the beginning. Therefore it may be that the centrifugal force becomes high enough to materially assist the pin 43 in moving the weights 19 and 20 out to the position shown in Figure 4. The weights 19 and 20 fly out immediately without causing the dog 21 to click against any of the other notches during the accelerating period.

When the arm 49 moving downward under force of the springs 69 and 70 reaches the extreme of its travel as determined by the stop 72, the housing 45 of the over-running clutch stops but the driven member 50 thereof continues to rotate with the wheel 10 and in so doing causes the over-running clutch mechanism to release so that the wheel spins freely.

The wheel 10 subsequently comes to a stop and the dog re-engages the notched wheel 15 to stop the wheel in register with a position corresponding to one of the notches 16 in the manner already described. The handle 62 may be released either before or after the wheel 10 comes to a stop. The release of the handle 62 causes the arm 49 to snap back to its upper position. In so doing it rotates the cup 46 of the over-running clutch in the direction in which it fails to drive the member 50. Consequently, the release of the handle 62 has no effect on the wheel 10.

It is thus seen that, I have provided a new and improved mechanical drive for spinning and then for stopping in register an indicating wheel or the like of the type described.

The improved driving and registering mechanism of my present invention advantageously may be employed for operating the random indicator for game apparatus and the like, such as, for example the apparatus shown and described in the copending application of Archie J. McMaster, Serial No. 64,235, filed February 17, 1936.

It will be readily apparent to those skilled in the art that the particular embodiment of my invention herein shown and described is by way of illustration only and that the invention is capable of numerous modifications and variations. I therefore do not wish to be limited except by the scope of the appended claims.

I claim:

1. In a device of the character described, a wheel, a weight movable on said wheel so that the distance of its center of gravity from the center of the wheel may vary, means for continually urging said weight in a direction to bring its center of gravity closer to the center of the wheel, a relatively fixed notched member having a series of notches arranged in a circular pattern concentric with the axis of said wheel, a dog operated by said weight and adapted to be brought into engagement with at least one of said notches when said weight moves to reduce the distance of its center of gravity from the center of the wheel.

2. In a device of the character described, a wheel, a plurality of similar weights individually movable on said wheel so that the distances of their separate centers of gravity from the center of the wheel may vary, said weights being spaced on said wheel to balance the same, means connecting said weights together so that they operate together to keep the wheel balanced when they vary the distances of their separate centers of gravity from the center of the wheel, means for continually urging said weights in a direction to bring their centers of gravity closer to the center of the wheel, a relatively fixed notched member having a series of notches arranged in a circular pattern concentric with the axis of said wheel, a dog carried by one of said weights and adapted to be brought into engagement with at least one of said notches when said weight moves to reduce the distance of its center of gravity from the center of the wheel.

3. In a device of the character described, a wheel, a plurality of similar weights individually movable on said wheel so that the distances of their separate centers of gravity from the center of the wheel may vary, said weights being spaced on said wheel to balance the same, means connecting said weights together so that they operate together to keep the wheel balanced when they vary the distances of their separate centers of gravity from the center of the wheel, means for continually urging said weights in a direction to bring their centers of gravity closer to the center of the wheel, a relatively fixed notched member having a series of notches arranged in a circular pattern concentric with the axis of said wheel, a dog carried by one of said weights and adapted to be brought into engagement with at least one of said notches when said weight moves to reduce the distance of its center of gravity from the center of the wheel, said means for urging said weights being adapted to exert greater components of force along the paths of travel of the centers of gravity of said weights when said dog engages said notches than when said weights are in such position that their separate centers of gravity are at their maximum distances from the center of said wheel.

4. In a device of the character described, a wheel, a weight movable on said wheel so that the distance of its center of gravity from the center of the wheel may vary, means for continually urging said weight in a direction to bring its center of gravity closer to the center of the wheel, a relatively fixed notched member having a series of notches arranged in a circular pattern concentric with the axis of said wheel, a dog operated by said weight and adapted to be brought into engagement with at least one of said notches when said weight moves to reduce the distance of its center of gravity from the center of the wheel, and driving means engaging said weight so as to exert a component of force tending to disengage said dog from the notched wheel, and so as to direct its full force in such a direction that said full force tends to rotate said wheel.

5. In a device of the character described a wheel, a pair of weights pivoted on said wheel so that the distances of their separate centers of gravity from the center of the wheel may vary, a link connecting said weights together so that they act together to keep the wheel balanced as they vary the distances of their separate centers of gravity from the center of the wheel, said link having a portion thereof which incident to the motion of said weights moves along a path which has a substantial component along an arc about the center of the wheel, rotary driving means, torque transmitting means connected between said rotary driving means and said point of said link to drive said link and said weights therewith said torque transmitting means being capable of transmitting torque to said link only for that direction of rotation of said driving means which forces said weights to increase the distances of their separate centers of gravity from the center of the wheel when the wheel is stationary, a relatively fixed notched member having a series of notches arranged in a circular pattern concentric with the axis of said wheel, a dog carried by one of said weights adapted to engage said notched member when said weights are at the minimum distance from the center of said wheel, and means for continually urging said weights towards the positions thereof in which said dog engages said notched member.

6. In a device of the character described, a wheel, a weight pivoted on said wheel so that the distance of its center of gravity from the center of the wheel may vary, means comprising a spring toggle for continually urging said weight in a direction to bring its center of gravity closer to the center of the wheel, said toggle being so arranged that as said weight turns on its pivot to bring its center of gravity closer to the center of the wheel, the ratio of the rate of change of the length of the spring to the rate of change of the distance of the center of gravity of the weight from the center of the wheel increases, a relatively fixed notched member having a series of notches arranged in a circular pattern concentric with the axis of said wheel, a dog operated by said weight and adapted to be brought into engagement with at least one of said notches when said weight moves to reduce the distance of its center of gravity from the center of the wheel.

7. In a device of the character described, a wheel, a pair of weights pivoted on said wheel so that the distances of their separate centers of gravity from the center of the wheel may vary, a link connecting said weights together so that they act together to keep the wheel balanced as they vary the distances of their separate centers of gravity from the center of the wheel, said link having a portion thereof which incident to the motion of said weights moves along a path which has a substantial component in the direction of an arc about the center of the wheel, a relatively fixed notched member having a series of notches arranged in a circular pattern concentric with the axis of said wheel a dog carried by one of said weights adapted to engage said notched member when the centers of gravity of said weights are at the minimum distances from the center of said wheel, means for continually urging said weights towards the position in which the distances of the separate centers of gravity of the weights from the axis of said wheel are minimum, driving means comprising an over-running clutch which includes a driven member thereof and means connecting said driven member to said portion of said link, said overrunning clutch being arranged to drive said link and said weights therewith in such a direction that said weights increase the distances of their separate centers of gravity from the center of the wheel when the wheel is stationary, whereby said driving means is adapted to force said dog quickly and positively out of engagement with said notched member.

WALTER VAN GUILDER.